Nov. 7, 1950

L. A. MEDLAR ET AL 2,529,038

MAXIMUM TEMPERATURE CUTOFF SYSTEM FOR BATTERY CHARGERS

Filed April 14, 1949

INVENTORS
James B. Godshalk,
BY Lewis A. Medlar,
Stone, Boyden & Mack,
Attorneys.

INVENTORS
James B. Godshalk,
Lewis A. Medlar,
BY Stone, Boyden & Mack,
ATTORNEYS Patented Nov. 7, 1950

2,529,038

UNITED STATES PATENT OFFICE 2,529,038

MAXIMUM TEMPERATURE CUTOFF SYSTEM FOR BATTERY CHARGERS

Lewis A. Medlar, Oreland, and James B. Godshalk, Philadelphia, Pa., assignors, by mesne assignments, to Sterlingworth Company, Philadelphia, Pa., a corporation of Delaware Application April 14, 1949, Serial No. 87,494

11 Claims. (Cl. 320—36)

This invention relates to battery chargers and particularly to improved battery charger control systems for automatically terminating charging when the internal temperature of the battery being charged reaches a predetermined value.

When a storage battery is charged at a high rate, as with a charging current of the order of 50 to 125 amperes in the case of automotive storage batteries, the internal, or electrolyte, temperature of the battery is increased as a result of charging. Maximum temperature cutoff devices operating in response to internal battery temperature have heretofore been employed in the battery charging art in two manners. First, such devices are used with time-switch controlled chargers as safety devices to make certain that charging will be terminated in the event that the internal temperature of the battery being charged reaches a maximum value above which continuation of the charge is likely to damage the battery. Second, such devices are used to eliminate the time-switch control usually employed to determine the duration of the charger.

In both instances, the maximum temperature cutoff devices heretofore employed in the battery charging art have included a thermostatic switch responsive to internal battery temperature to control the actuating circuit of a relay having contacts in the charging circuit, the actuating circuit being supplied either from the power supply of the charger or from the battery being charged. Though such devices have gained considerable commercial acceptance, they have not as yet proved entirely satisfactory in use. The primary reason for this is the delicate nature of the thermostatic switch, which results in erratic operation and frequent total failure, particularly when used with a fast charger subjected to rough handling in automotive service stations.

An object of the present invention is to provide a novel maximum temperature cutoff system for battery chargers which will eliminate the thermostatic switch heretofore used with such devices and will operate with greatly improved uniformity and dependability.

To this end, the invention employs as the temperature sensitive element a thermally responsive impedance, preferably a thermally responsive resistor of the type now generally known in the electrical arts as a thermistor, this impedance being immersed in the electrolyte of the battery by insertion through a filling opening in the battery casing and being electrically connected in a balanceable network, the output of which is employed to operate a relay or like circuit interrupter having contacts in the charging circuit.

Another object of the present invention is to provide a novel electronic tube circuit under the influence of a thermally responsive impedance for actuating a contactor in the charging circuit of a battery charger, and to provide novel means for assuring positive operation of said electronic tube circuit.

In order that the foregoing and other novel features of the invention may be readily understood, reference is had to the accompanying drawings forming a part of this specification, and in which.

Figure 1:
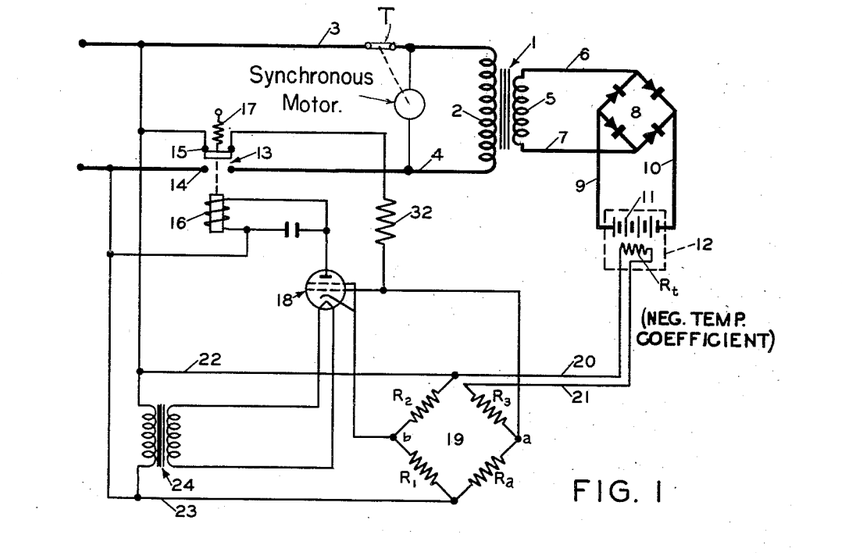
Fig. 1 is a schematic diagram of a maximum temperature cutoff device applied according to the present invention to a conventional fast charger.

Referring to the drawings in detail, and more particularly first to Fig. 1, the invention is shown as applied to a conventional fast charger, the charging circuit of which comprises a transformer 1 having a primary winding 2 supplied from a commercial alternating current source by conductors 3 and 4. Secondary 5 of transformer 1 supplies the remainder of the charging circuit, which consists of conductors 6 and 7, conventional rectifier 8 and leads 9 and 10 connected to the battery 11 to be charged. The casing 12 of battery 11 is illustrated by dotted lines. The usual time switch T, actuated by a synchronous motor and suitable clock mechanism, is provided to determine the duration of charging.

Located in a convenient portion of the charging circuit just described is a contactor 13, in the present embodiment illustrated as a relay comprising a circuit closing member movable between and adapted to bridge either a first set of contacts 14 in supply lead 4 of the charging circuit or a second set of contacts 15 controlling a circuit to be hereinafter described. The relay is provided with an actuating winding 16 and is normally biased, as by spring 17, to close contacts 15 and open contacts 14, energization of the actuating winding causing contacts 14 to be closed and contacts 15 to be opened.

Winding 16 is connected in the plate circuit of a thermionic tube 18, and the cathode and control grid of tube 18 are connected across the output points $a$, $b$ of a Wheatstone bridge 19. Bridge 19 comprises standard resistances $R_1$ and $R_2$ making up two arms of the bridge, a resistance $R_a$ in a third arm, and, in the arm balancing said third arm, a thermally responsive resistance $R_t$ having a negative temperature coefficient. $R_t$ is preferably a thermistor of that general type prepared by molding and firing mixtures of semiconductive oxides of such metals as manganese, nickel, cobalt and copper, usually with a binder such as sodium silicate.

Such thermistors are available to the trade in either rod or disc form. We prefer to employ such a molded thermistor of rod form having approximate dimensions on the order of ½ inch in length and ⅛ inch in diameter. When such a thermistor is employed, it may be necessary to include an additional fixed resistance $R_3$ in series therewith to bring the thermistor arm of the bridge up to a convenient resistance value, though it is desirable to use $R_t$ alone, where a thermistor of sufficiently high value is available.

Thermistor $R_t$ is connected into the bridge by conductors 20 and 21 which, as will be more completely described hereinafter, are embodied in a flexible insulated cable of such length that the thermistor can be inserted in the battery at a distance from the charger casing. In the form of the invention shown in Fig. 1, the bridge may be supplied with alternating current by conductors 22 and 23 connected across the charger supply circuit. Tube 18 as usually constructed will include a cathode heater, and this is shown in Fig. 1 as being supplied by a transformer 24, the primary of which is connected across the charger supply circuit in parallel with the bridge supply. The plate circuit of tube 18, including coil 16, is connected to conductor 23.

It will thus be seen that this form of the invention includes contactor 13, an actuating circuit therefor including winding 16 and tube 18, and a bridge circuit under influence of a thermistor $R_t$ and having its output connected across the cathode and control grid of tube 18.

Since it is necessary that $R_t$ be subjected to the internal temperature of the battery being charged by being immersed in the battery electrolyte, $R_t$ is provided with a protective casing and this casing is adapted to be inserted through a filling opening in the battery case. A preferred form of thermistor unit for use with the circuit illustrated in Fig. 1 is shown in detail in Fig. 2. A relatively heavy, substantially tubular heat conducting casing 25, having a closed end, is secured over the end of a flexible insulated cable 26 which includes the conductors 20 and 21 previously mentioned in connection with Fig. 1. The joint between cable 26 is made fluid tight, as, for example, by crimping the casing at 27. Before casing 25 is secured in place, one end of thermistor $R_t$ is connected to conductor 20 as shown at 28, as by soldering, and a sleeve 29 of suitable insulating material is placed over the bared portion of conductor 20 and a substantial portion of the length of the thermistor $R_t$. The other end of thermistor $R_t$ is connected, as at 30, to conductor 21. The thermistor is thus supported substantially entirely by the conductors 20 and 21. An insulating sleeve 31 is provided to prevent the thermistor from laterally contacting the casing 25.

Thermionic tube 18 is preferably of the type generally known in the art as a "thyratron." When used with alternating current voltages on the plate and grid, such tubes are conductive only when the plate is positive with respect to the cathode and the grid is positive or nearly positive with respect to the cathode. Stated differently, when the plate and grid voltages with respect to the cathode are in phase, the tube will conduct, but when the plate and grid voltages are 180° out of phase, the tube will not conduct. Thus, to determine whether or not such a tube will conduct, the control voltage on the grid must not only be of sufficient amplitude but it must also be of the proper phase relationship with the plate voltage. Other thermionic tubes than the "thyratron" can be used.

When the bridge 19 is balanced, there is no potential across the output terminals $a$, $b$. Unbalance of the bridge in one sense causes a potential of one phase across the output terminals, while unbalance in the opposite sense reverses the phase of this potential. The output terminals of the bridge are connected to the control electrode and the cathode of tube 18. Therefore, as the bridge swings through the balance point, the phase of the potential at the control electrode of tube 18 reverses, and the tube will become either conductive or non-conductive, depending upon the sense of unbalance of the bridge.

It will be understood, by those skilled in the art that the precise instant at which the tube becomes conductive or non-conductive during the swing of the bridge through the balance point will depend upon the particular characteristics of the tube used in the circuit, and that, in fact, a particular tube may become conductive upon occurrence of a grid potential such as −1 volt, which in the present apparatus represents a slight unbalance of the bridge. Accordingly, when in this specification and appended claims we state that balancing of the bridge, or the swinging of the bridge through the balance point, actuates the tube, we mean this terminology to include those cases where the tube responds as the bridge closely approaches the balance point.

Value of the arms of bridge 19 comprising $R_t$,

R3 and Ra must be of such magnitude that the supply voltage of the bridge will not generate so much heat as to produce an appreciable increase in the temperature of Rt. The ratio of Rt+R3 to Ra must be the same at balance point of the bridge as the ratio of R2 to R1.

Upon investigation of the mathematical relationship involved in the design of the bridge, we have found that there is a definite relative value of R2 which cannot be exceeded if the circuit is to operate. When R1 is equal to R2, this value is given by the equation:

$$R_2 = \frac{(2E_v - E_s)^2}{8P_c}$$

where, Ev is the voltage drop in tube 18 during tube conduction, Es is the direct current value of ½ of the alternating current supply wave, and Pc is the average power over a full alternating current cycle required to operate the relay. It will be seen from this relationship that, unless a very low power relay is used, the value of R2, and therefore the value of R1, would be so low that the wattage dissipated by those resistors in their half of the bridge would be excessive. This disadvantage can be avoided, we have found, by making the ratio of R1 to R2 about 2:1, thus maintaining a sufficiently low value of R2 to satisfy the above relationship and yet to provide in the half of the bridge comprising R1 and R2 resistance sufficient that the wattage dissipated in R1 and R2 will not be excessive.

With R1=2R2, the relationship given above becomes:

$$R_2 = \frac{(3E_v - 2E_s)^2}{24P_c}$$

Choice of resistance values in the manner described has a particular advantage in that it allows a relatively high bridge supply voltage, such as the 110 volts which is usually available from the charger supply, and eliminates the necessity for a coupling transformer between the bridge and tube 18, while at the same time providing maximum sensitivity of the tube.

As has been stated, thermistor Rt in this form of the invention has a distinct negative temperature coefficient. The value of Ra is chosen or adjusted such that the ratio of values of R2 to R1 is the same as that for Rt+R3 to Ra, when Rt is at a temperature substantially equal to the maximum cutoff temperature desired, for example, 125° F. Thus the bridge is substantially balanced at this temperature.

The value of Ra thus depends upon the value of the thermistor arm of the bridge when Rt is at the cutoff temperature, and the grid potential to which the particular tube employed responds.

When a charger employing the maximum temperature cutoff device described in connection with Fig. 1 is first connected to the battery to be charged, and the thermistor unit is inserted in the battery, thermistor Rt will be at the relatively low temperature of the battery and will therefore have a corresponding relatively high resistance value. Since Ra has been set or chosen to balance the bridge when Rt is at a lower resistance value, the bridge will be unbalanced in a sense causing point $a$ to be positive with respect to point $b$, and tube 18 will therefore be conductive, winding 16 will be energized, and contacts 14 will be maintained closed, allowing charging to proceed. Thermistor Rt generally requires about one minute after insertion in the battery to assume the internal temperature of the battery. It will be clear that, presuming that the thermistor is initially at a temperature relatively low compared to the cutoff temperature, contacts 14 are accordingly closed when the charger is set up to charge the battery. A manual switch may be included in the charging circuit if desired.

As the internal temperature of the battery increases during charging, the resistance of Rt gradually decreases until finally, when the internal temperature of the battery reaches the cutoff temperature, the bridge swings through the balance point, and galvanometer terminal $a$ becomes negative with respect to terminal $b$; tube 18 therefore becomes non-conductive, and relay 13 is de-energized, opening contacts 14 to break the charging circuit and closing contacts 15 to connect resistance 32 in parallel with Rt plus R3. Insertion of resistance 32 into the circuit further unbalances the bridge in a sense tending to maintain tube 18 non-conductive.

Magnitude of resistance 32 depends upon the manner in which the maximum temperature cutoff system is employed. If the present system is employed on a fast charger in conjunction with a time switch, as illustrated in Fig. 1, it is desirable that the system, upon occurrence of the predetermined internal battery temperature, de-energize both the charging circuit and the time switch motor, and then allow both to be re-energized when the battery has cooled a predetermined amount. Obviously, in such a case, the cooling period is determined by the magnitude of resistance 32. But, if the present system is employed on a fast charger and the time switch is omitted, final termination of charging depends entirely upon the maximum temperature cutoff system, and the charger must not be re-energized regardless of how much the battery cools. Therefore, when the present system is employed as the only means for de-energizing the charger, resistance 32 must have a value less than that of the thermally responsive arm of the bridge at the cutoff temperature, as more fully described hereinafter with reference to Fig. 6.

Figure 1A:
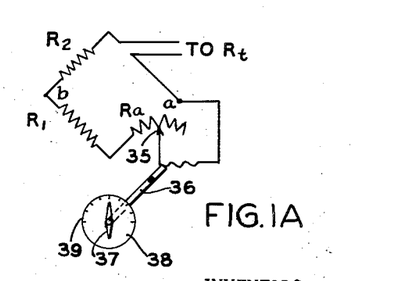
Fig. 1A is a schematic diagram of a modified form of Wheatstone bridge which may be employed in the apparatus shown in Fig. 1.

Resistance Ra may, as pointed out above, be fixed at the factory to provide one predetermined cutoff point, or it may be variable and provided with suitable manual adjusting means and a co-operating indicator calibrated in terms of temperature, in order that the operator may choose any desired maximum cutoff temperature. As shown diagrammatically in Fig. 1A, Ra may comprise a potentiometer including a movable contact 35 adjustable by means of a rotatable shaft 36 and manually operated knob 37. Knob 37 is preferably located on the front panel of the main casing of the charging apparatus, and cooperates with a suitable dial 38 carrying a scale 39 calibrated in terms of cutoff temperature.

Further, Ra may comprise a potentiometer with output terminal $a$ as the movable contact thereof, in which case the bridge is adjusted by adjusting the output terminal $a$, as is shown, for adjusting the output terminal $a$, as is shown, for example, in Fig. 7, which illustrates an embodiment of the invention hereinafter described.

The relay actuating circuit has, in its preferred embodiment, been so organized that contactor 13 is normally biased by spring 17 to open contacts 14 and so maintain the charging circuit de-energized, contacts 14 being closed only when tube 18 is conductive. Therefore, all failures in any part of the circuit which result in tube 18 becoming non-conductive will necessarily result in opening of contacts 14 and de-energization of the charger circuit, and the maximum temperature cutoff device thus offers substantially "fail-safe" operation.

The plate circuit is shown as connected to conductor 23 of the bridge input, and operation of the circuit described has assumed this to be true and has also assumed $R_1 = 2R_2$. As will readily be understood by those skilled in the art, the relationship between operation of tube 18 and the temperature of thermistor $R_t$ can be reversed if desired, depending upon the side of the bridge input circuit to which the plate circuit is connected, and upon the relative values of the elements of bridge 19. When the plate circuit is connected to conductor 23, and the relative values of $R_1$, $R_2$, $R_t + R_3$, and $R_a$ are as described, the actuating circuit operates to maintain contacts 14 closed up to the time $R_t$ reaches a resistance value indicating that the internal temperature of the battery is at the predetermined maximum, whereupon coil 16 is deenergized and the contactor is opened by spring 17. In Fig. 7, there is illustrated a modification of the apparatus shown in Fig. 1, this modification being generally similar to the apparatus of Fig. 1 but arranged so that the relay controlling the charging circuit is normally biased to a position completing the charging circuit.

Figure 7:
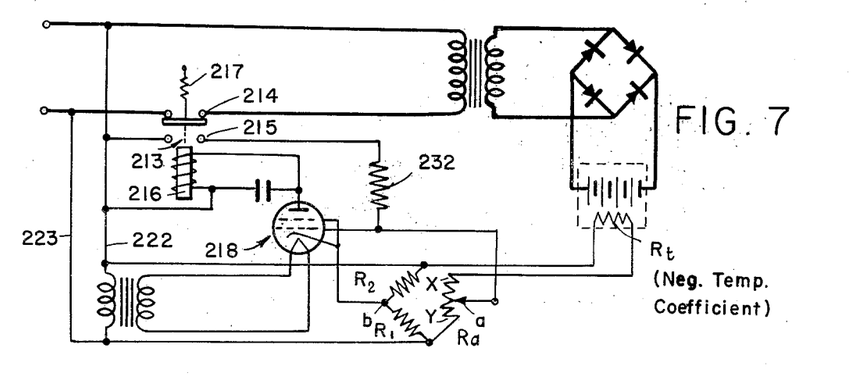
Fig. 7 is a schematic diagram of a modification of the apparatus shown in Fig. 1.

Referring in detail to Fig. 7, it will be seen that relay 213 includes contacts 214 in the charging circuit and contacts 215 in the bridge unbalancing circuit, and is normally biased, as by spring 217, to close contacts 214. Actuating winding 216 of the relay is connected in the plate circuit of the tube 218, and in this embodiment of the invention the plate circuit is connected to conductor 222 of the bridge input circuit. The bridge is again shown as comprising ratio arms consisting of resistances $R_1$ and $R_2$. The remaining two arms of the bridge comprise, respectively, the combination of $R_t$ and portion X of $R_a$, and the remaining portion Y of $R_a$. Thus, the bridge output point $a$ is the movable contact of potentiometer $R_a$, and the relative resistance values of these two arms of the bridge depend upon the position of this movable contact and upon the temperature of $R_t$, which again has a negative temperature coefficient.

In this embodiment of the invention, since the plate circuit is connected to conductor 222 instead of conductor 223, the ratios of the bridge must be reversed, so that, for example, $R_2$ may be twice $R_1$, and the ratio of $R_t + X$ to Y will of course be the same, at the balance point of the bridge, as the ratio of $R_2$ to $R_1$. In that event, when $R_t$ is relatively cold, the bridge will be unbalanced in a sense causing point $a$ to be negative with respect to point $b$. Therefore, when $R_t$ is first inserted in the battery to be charged, and the circuit is as shown in Fig. 7, the tube 218 will be non-conductive, the winding 216 de-energized, and contacts 215 will therefore be open while contacts 214 will be closed, so that charging may proceed. As the temperature of the battery rises as a result of charging, the resulting resistance change in $R_t$ balances the bridge, point $a$ therefore becomes positive with respect to point $b$, and tube 218 is accordingly made conductive, energizing winding 216. When winding 216 is energized, contacts 214 are opened and contacts 215 closed, so that the flow of current in the charging circuit is terminated and unbalancing resistance 232 is connected in parallel with $R_t$, causing the bridge to be unbalanced decisively in a sense maintaining tube 218 conductive.

Figure 3:
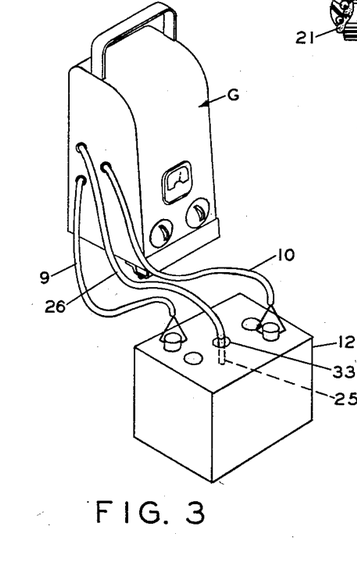
Fig. 3 is a perspective view illustrating the manner in which a fast charger, including the maximum temperature cutoff device of the present invention, is applied to a battery to be charged.

When the present invention is employed in an automotive fast charger the bridge circuit and the relay actuating circuit, along with the major components of the charging circuit, are housed in the usual charger casing. As illustrated in Fig. 3, the thermistor unit is connected into the bridge circuit in the charger casing by cable 26, which must be relatively long and flexible, in order that the thermistor unit may be easily inserted through the filling opening 33 in battery case 12 at a distance from charger G. Ordinarily, in the case of automotive batteries, the charger is moved to the automobile, and the battery charged without being removed. This practice results in frequent handling of the charger, and since cable 26 hangs free from the charger casing, the thermistor unit is subjected to relatively severe mechanical shocks.

Figure 2:
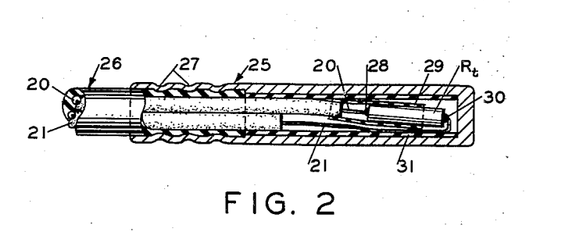
Fig. 2 is a detailed longitudinal section through one form of thermally sensitive impedance unit embodying the invention and employed to control the cutoff device illustrated in Fig. 1, parts being shown in elevation.

It is inability of the usual thermostat to withstand such continual hard usage that has resulted in failure of conventional maximum temperature cutoff units. We find that thermistor units of the type shown in Fig. 2 are capable of withstanding far greater mechanical shocks than are encountered in the normal usage of automotive fast chargers, despite the fact that the thermistor itself is a relatively fragile article. Thus, the invention combines substantially positive and "fail-safe" operation of the relay actuating circuit with greatly improved durability of the thermally responsive unit.

Figure 4:
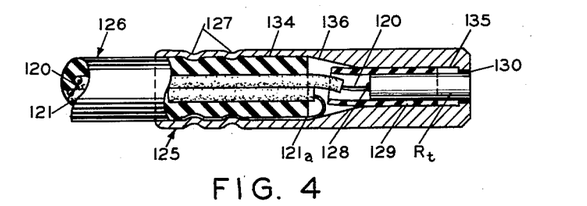
Fig. 4 is a detailed longitudinal section through a modified form of thermally sensitive impedance unit embodying the invention, parts being shown in elevation.
Figure 5:
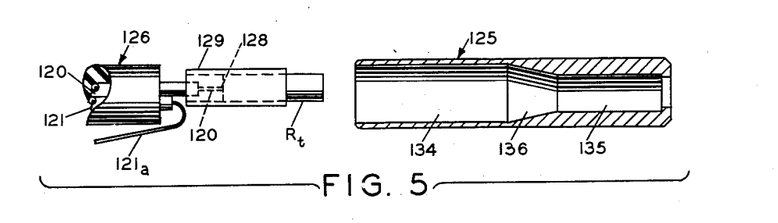
Fig. 5 is a view partly in side elevation and partly in longitudinal section, showing the device of Fig. 4 which the parts separated, and illustrating the manner in which the device is assembled.
Figures 6, 6A:
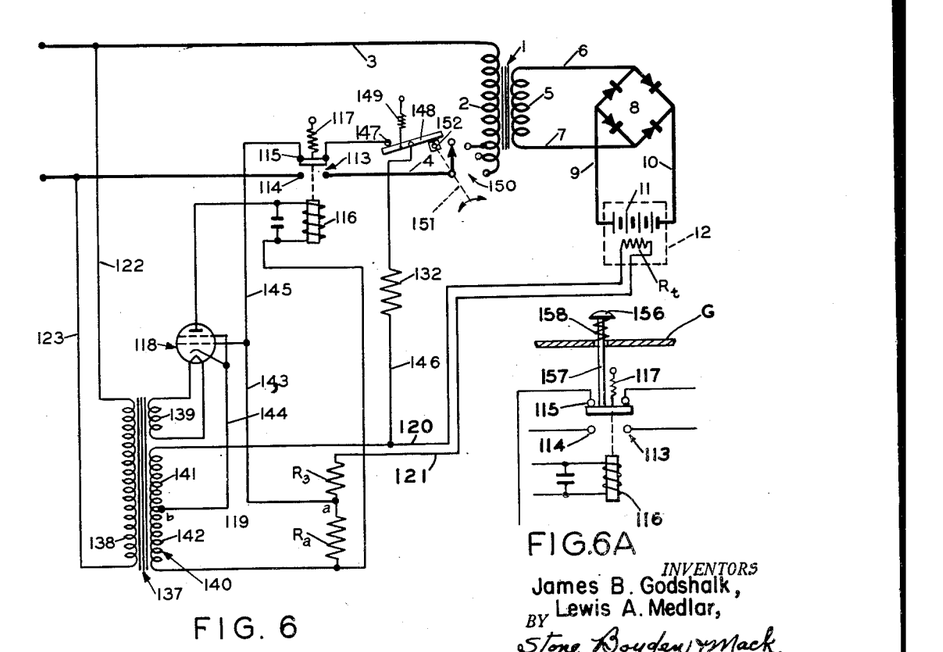
Fig. 6 is a schematic diagram of a modified form of maximum temperature cutoff device employing the thermally sensitive impedance unit shown in Fig. 4 and applied to a conventional fast charger.
Fig. 6A illustrates a push-button device capable of use with the relay employed in the apparatus shown in Fig. 6.

It will be noted that the circuit shown in Fig. 1 is such that, since the bridge is supplied directly from the charger input, thermistor $R_t$ must be electrically isolated from the battery electrolyte, and that this is accomplished, as shown in Fig. 2, by spacing the thermistor from casing 25 and employing insulating sleeve 31. This provides the necessary safety, but does not provide optimum transfer of heat from the battery electrolyte to thermistor $R_t$. In Figs. 4, 5 and 6, we have illustrated a modification of our invention which provides both optimum safety and optimum transfer of heat from the battery electrolyte to the thermistor. In this modification, the thermistor is placed in substantially direct heat transfer relation with the battery electrolyte, and since this necessitates also putting the thermistor in electrical contact with the battery electrolyte, the bridge circuit is isolated from the alternating current supply of the charger.

Referring in detail to Fig. 4, which shows the thermistor unit of this modification of our invention, a substantially tubular casing 125 of lead plated bronze or like conductive material is provided with an internal bore comprising a portion 134 of relatively large diameter, a portion 135 of relatively small diameter, and an intermediate tapering portion 136 connecting portions 134 and 135, the bore of the casing opening to the exterior at each end. Casing 125 is secured over the end of a conventional insulated flexible cable 126, as by crimping at 127. Cable 126 includes conductors 120 and 121 and the usual relatively thick insulating sheath. Thermistor $R_t$ is positioned within the smaller bore 135 and is electrically connected to the casing by solder at 130. This seals the bore against entrance of liquid. At its other end, thermistor $R_t$ is connected to conductor 120, as by soldering at 128. Portion 135 of the bore of casing 125 is slightly larger in diameter than is thermistor $R_t$, allowing space for a sleeve 129 of suitable electrical insulating material, which sleeve extends over a substantial portion of the length of the thermistor, and completely covers the bared portion of conductor 120. Conductor 121 terminates in a bared end portion 121a bent back and disposed between the outer surface of cable 126 and the inner surface of casing 125 and held in good electrical contact with the casing by the crimping 127. It will be noted that the diameter of cable 126, by reason of the thickness of the insulation of the cable, is substantially greater than the diameter of thermistor $R_t$.

The thermistor unit just described provides a continuous electrical path comprising conductor 120, thermistor $R_t$, solder joint 130, casing 125 and conductor 121. Casing 125 is adapted to be immersed in the electrolyte of a battery, and when it is so immersed, thermistor $R_t$ is electrically connected to the battery electrolyte.

Fig. 5 illustrates the manner in which the structure just described is adapted for assembly with a minimum of assembly operations. The outer insulation of cable 126 is first stripped down to free the ends of conductors 120 and 121, which are then bared for a distance as shown. One end of thermistor $R_t$ is then soldered to the end of conductor 120, and insulating sleeve 129 is slipped into place to cover a major part of the length of the thermistor and also the bared portion of conductor 120. Bared portions 121a of conductor 121 is bent over the outer insulation of the cable as shown. The resulting thermistor assembly is then inserted into casing 125 via the larger portion 134 of the bore, and tapered portion 136 of the casing bore guides the thermistor into proper position. Solder joint 130, Fig. 4, is then made, and the casing crimped at 127 to cable 126, thus assuring contact between portion 121a of conductor 121 and casing 125, and completing the assembly. Tapered portion 136 of the casing bore thus serves the dual function of guiding the thermistor into place during assembly, and providing greater mechanical strength and heat conductivity to the casing by reason of the added mass of the casing involved in the tapered portion.

Again referring to Fig. 4, it will be seen that the portion of casing 125 comprising section 135 of the bore is relatively thick when compared with the remainder of the casing, and that the bore is closely spaced with respect to thermistor $R_t$. Though most of the heat transferred to the thermistor is conducted by solder joint 130, both from the electrolyte directly and from the casing, the close spacing between the thermistor and the relatively thick portion of the casing permits added heat transfer to the thermistor. The provision of adequate transfer of heat from the battery electrolyte to the thermistor $R_t$ when the thermistor unit is immersed in the battery electrolyte is of particular importance in obtaining accurate and uniform operation of the maximum temperature cutoff device, since there is a tendency for heat to be conducted away from the thermistor rather rapidly by conductors 120 and 121. The device illustrated in Figs. 4 and 5 is more fully disclosed in co-pending application, Serial Number 137,804, filed January 9, 1950, by Lewis A. Medlar, now Patent Number 2,526,251. It will be understood that the present invention comprises the combination, in a battery charging apparatus, of a thermistor-controlled temperature responsive control circuit, while the aforesaid co-pending application Serial Number 137,804 is directed to the details of a thermistor unit which may be used in such control circuits.

As previously pointed out, in order that a thermistor unit of the type illustrated in Fig. 4 can be used to control a maximum temperature cutoff device in accordance with the present invention, it is necessary that the circuit including the thermistor be isolated electrically from the alternating current supply of the battery charger, since when this type of thermistor unit is used the thermistor is in electrical contact with the battery electrolyte when the thermistor unit is immersed therein. A preferred maximum temperature cutoff circuit effecting this isolation is illustrated in Fig. 6.

Referring now in detail to Fig. 6, it will be seen that this embodiment of the invention is again shown as applied to a conventional battery charger having a charging circuit comprising transformer 1, including a primary winding 2 supplied with alternating current by conductors 3 and 4, and a secondary winding 5 supplying a conventional rectifier 8 through conductors 6 and 7, the output of the rectifier being connected to the battery 11 by conductors 9 and 10. A contactor 113 is employed and is shown as a relay comprising contacts 114 in the charging circuit and contacts 115 in an unbalancing circuit, the relay being biased, as by spring 117, to normally close contacts 115. Actuating winding 116 of the relay is connected in the plate circuit of a thermionic tube 118, which is preferably a "thyratron."

In this embodiment, a Wheatstone bridge 119 is supplied by an isolation transformer designated generally by the reference character 137. This transformer has a primary winding 138 connected across the alternating current supply circuit of the charger. The secondary of this transformer includes a winding 139 supplying the heater of tube 118, and a second winding electrically distinct from winding 139 and designated by the reference numeral 140. Winding 140 is tapped at point b, thus providing two inductances 141 and 142.

Bridge 119 again comprises $R_t$ and $R_3$ in one arm, and $R_a$ in the arm balancing the thermistor arm of the bridge. The remaining two arms of bridge 119 comprise inductances 141 and 142, and the output terminals of the bridge therefore include the point b at which winding 140 is tapped. Output terminals a, b are connected across the control grid and cathode of tube 118 by conductors 143 and 144. The plate of tube 118 is connected to the input point of bridge 119 nearest resistance $R_a$. An unbalancing circuit comprising conductor 145, contacts 115 of the relay, and conductor 146, connect a fixed resistance 132 in parallel with thermistor $R_t$ when the relay is de-energized.

The values of inductances 141 and 142 are determined by location of point b on winding 140. The value of $R_a$ is again chosen, or adjusted at the factory, such that the bridge will be substantially balanced when thermistor $R_t$ is at the temperature desired as the maximum temperature cutoff point. Operation of the circuit is substantially identical with that described in connection with the circuit of Fig. 1. When thermistor $R_t$ is immersed in the electrolyte of battery 11, and the battery is at its initial relatively low temperature, bridge 119 is, by reason of the relatively high resistance of $R_t$, unbalanced in a sense causing tube 118 to be conductive, and winding 116 of the relay is energized to maintain contacts 114 closed, completing the charging circuit. When the internal temperature of the battery reaches the predetermined maximum value, bridge 119 is substantially rebalanced, due to the drop in resistance of $R_t$, tube 118 therefore becomes non-conductive, and the relay relaxes to close contacts 115, completing the unbalancing circuit including resistance 132, and thereby positively unbalancing the bridge in a sense to maintain tube 118 non-conductive.

It will be noted that, in the circuit shown in Figure 6, no time switch has been shown. This particular embodiment of the invention is adapted for charging by that method wherein charging is terminated when the internal temperature of the battery reaches a predetermined maximum, usually chosen as 125° F. As previously pointed out, when the invention is employed in this manner, it is necessary that resistance 132 have a value less than the value of $R_t$ at the cutoff temperature, so that, once the device has operated to open contacts 114 and so break the charging circuit, the bridge cannot again be balanced as $R_t$ cools. This being true, it is necessary that some means be provided for breaking the unbalancing circuit including resistance 132, in order that the charger can be energized when next employed. One method for accomplishing this is the provision of a manual push-button, for moving the armature of relay 113 to break contacts 115. Such an arrangement is illustrated in Fig. 6A. Here, the relay 113 is equipped with a push-button 156 including a shaft 157 extending through the casing G of the charging apparatus, the push-button being opposed by a spring 158. Manual depression of the push-button causes shaft 157 to engage the contact bridging element of the relay 113, forcing that element out of engagement with contacts 115 and thus breaking the unbalancing circuit.

In the present embodiment, however, we prefer to employ a normally closed switch in the unbalancing circuit, and to provide means whereby adjustment of the usual tap switch also momentarily breaks the normally closed switch. Such a combination is illustrated diagrammatically in Fig. 6, the normally closed switch comprising a fixed contact 147 and a pivoted contact arm 148 normally held in contact therewith, as by spring 149. The conventional tap switch 150 includes manual operating shaft 151, and, in the present embodiment of the invention, there is provided on this shaft a cam 152 so designed as to pivot contact 148 momentarily to open position whenever the tap switch is adjusted one tap. It will be seen that the tap switch is illustrated as comprising four stationary contacts, the first of which is blank, and that cam 152 accordingly is illustrated as being a square, with one side parallel with contact arm 148 when the tap switch is adjusted to any one of its four positions. Thus, any adjustment of the tap switch automatically interrupts, and then restores, the unbalancing circuit. Momentary interruption of the unbalancing circuit allows tube 118 to become conductive, if $R_t$ is at a sufficiently low temperature, and relay 113 is accordingly energized to close contacts 114.

In Fig. 1, we have shown the maximum temperature cutoff device as including a negative coefficient thermistor as $R_t$ and having relay 13 normally biased to break the charging circuit. In Fig. 7, we have shown the device as including a negative temperature coefficient thermistor as $R_t$ and having relay 213 normally biased to complete the charging circuit. It will be obvious to those skilled in the art that $R_t$ may have a positive, rather than a negative temperature coefficient. If a thermistor having a positive temperature coefficient is employed, the value chosen for $R_a$ will then be higher than the value of the thermistor when cold, and the resistance of the thermistor will of course increase as the temperature of the battery increases.

Figure 8:
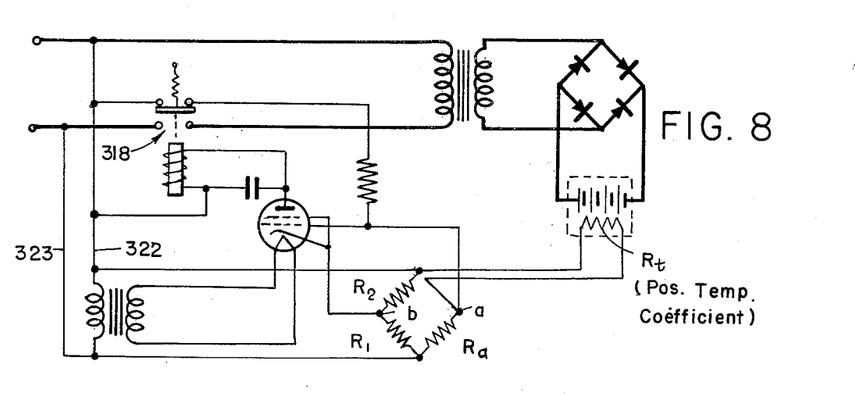
Fig. 8 is a schematic diagram of one embodiment of the invention employing a positive temperature coefficient thermistor subjected to battery temperature and a relay arranged to normally break the charging circuit.
Figure 9:
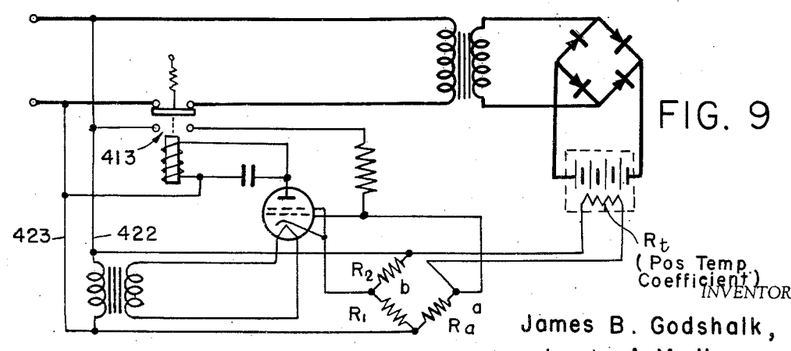
Fig. 9 is a schematic diagram of another embodiment of the invention employing a positive temperature coefficient thermistor.

Use of a positive temperature coefficient resistance for $R_t$ will reverse the sense of operation of the thermally responsive control circuit, and it is therefore necessary to reverse the arrangement of the relay controlled by that circuit. Thus, in Fig. 8, $R_t$ has a positive temperature coefficient, the relay 313 is arranged to normally break the charging circuit, and the plate circuit of the thermionic tube is connected to conductor 322 of the bridge supply. And in Fig. 9, $R_t$ again has a positive temperature coefficient, but the plate circuit of the thermionic tube is conected to conductor 423 of the bridge supply, and the relay 413 is accordingly arranged to normally complete the charging circuit.

It will be understood by those skilled in the art that other thermally responsive impedances than the preferred example mentioned herein may be employed without departing from the scope of the invention.

We have stated that the thermistor unit employed in our invention is, in actual practice, immersed in the electrolyte of the battery being charged. By employing the term "immersed" in this specification and the following claims, we do not mean to imply that the thermistor unit of the invention need be completely covered by the electrolyte. In practice, it is only necessary that the thermistor unit be inserted through the filling opening of the battery into good thermal contact with the electrolyte thereof.

We claim:

1. In a battery charger the combination of, a charging circuit for supplying charging current to a battery, a relay having contacts in said charging circuit and having an actuating winding, and a control circuit for causing said relay to interrupt said charging circuit whenever the internal temperature of the battery being charged reaches a predetermined value, said control circuit comprising a Wheatstone bridge including in one arm an impedance of predetermined value and in the balancing arm a thermally variable impedance adapted to be subjected to the internal temperature of the battery being charged, whereby said bridge is unbalanced in one sense when the internal temperature of the battery is below said predetermined value and is rebalanced when the internal temperature of the battery reaches said predetermined value during charging; a thermionic tube having a cathode, control grid and plate; a circuit connecting the output of said bridge across the cathode and control grid of said tube, and a plate circuit for said tube, said plate circuit including the actuating winding of said relay.

2. In a battery charger the combination of, a charging circuit for supplying charging current to a battery; a contactor normally biased to open position in said charging circuit; a Wheatstone bridge including in one arm an impedance of predetermined value and including in the arm balancing said one arm a thermally variable impedance, means by which said impedance may be subjected to the internal temperature of the battery being charged, whereby said bridge is unbalanced in one sense when the internal temperature of the battery being charged is below a predetermined value and is substantially rebalanced when the internal temperature of the battery reaches said predetermined temperature during charging; a thermionic tube including a cathode, a control grid and a plate; a circuit connecting the output of said bridge across the cathode and grid of said tube; a plate circuit for said tube so connected that said tube is maintained conductive when said bridge is unbalanced in said one sense and becomes non-conductive when said bridge substantially rebalances, and a winding in said plate circuit serving to maintain said contactor closed while said tube is conductive.

3. In a battery charger the combination of, a charging circuit for supplying charging current to a battery; a contactor normally biased to open position in said charging circuit; a Wheatstone bridge including in one arm an impedance of predetermined value and including in the arm balancing said one arm a thermally variable impedance adapted to be subjected to the internal temperature of the battery being charged, whereby said bridge is unbalanced in one sense when the internal temperature of the battery being charged is below a predetermined value and is substantially rebalanced when the internal battery temperature reaches said predetermined value during charging; a thermionic tube including a cathode, a control grid and a plate; a circuit connecting the output of said bridge across the cathode and grid of said tube; a plate circuit for said tube so connected that said tube is maintained conductive when said bridge is unbalanced in said one sense and becomes non-conductive when said bridge substantially rebalances; a winding in said plate circuit for maintaining said contactor closed while said tube is conductive, and unbalancing circuit completed upon de-energization of said plate circuit for positively unbalancing said bridge in a sense to maintain said tube non-conductive.

4. In a battery charger the combination of, a charging circuit for supplying charging current to a battery; a relay including an actuating winding, a first set of contacts and a second set of contacts and being biased to close said first set of contacts and open said second set of contacts when said winding is de-energized; a Wheatstone bridge including in one arm an impedance of predetermined value and in the arm balancing said one arm a thermally responsive impedance adapted to be subjected to the internal temperature of the battery being charged, whereby said bridge is unbalanced in one sense when the internal temperature of the battery being charged is below a predetermined value and is rebalanced when the internal temperature of the battery reaches said predetermined value during charging; a thermionic tube having a cathode, a control grid and a plate; a circuit connecting the output of said bridge across the cathode and control grid of said tube; a plate circuit for said tube so connected that said tube is maintained conductive when said bridge is unbalanced in said one sense and becomes non-conductive when said bridge substantially rebalances; and an unbalancing circuit connecting an impedance in parallel with said thermally responsive impedance, said unbalancing circuit being conductive only when said first set of relay contacts is closed and said charging circuit being conductive only when said second set of relay contacts is closed.

5. In a battery charger the combination of, a charging circuit for supplying charging current to a battery; a relay having contacts in said charging circuit; a Wheatstone bridge including in one arm an impedance of predetermined value and in the arm balancing said one arm a thermally responsive impedance adapted to be subjected to the internal temperature of the battery being charged, whereby said bridge is unbalanced in a definite sense when the internal temperature of the battery being charged is below a predetermined value and is substantially rebalanced when the internal temperature of the battery reaches said predetermined value during charging; means responsive to the output of said bridge for maintaining said contacts of said relay closed to complete said charging circuit only while said bridge is unbalanced in said definite sense; an unbalancing circuit connected to said bridge only when said contacts of said relay are open, said unbalancing circuit being arranged to unbalance said bridge in a sense opposite to said definite sense and the impedance of said unbalancing circuit being such as to prevent said bridge from being rebalanced by changes in value of said thermally responsive impedance due to cooling of the battery, and means for breaking said unbalancing circuit.

6. In a battery charger the combination of, a charging circuit for supplying charging current to a battery; a relay having normally open contacts in said charging circuit; a Wheatstone bridge including in one arm an impedance of predetermined value and in the arm balancing said one arm a thermally responsive impedance adapted to be subjected to the internal temperature of the battery being charged, whereby said bridge is unbalanced in one sense when the internal temperature of the battery being charged is below a predetermined value and is substantially rebalanced when the internal temperature of the battery reaches said predetermined value during charging; a thermionic tube including a cathode, a control grid, and a plate; a circuit connecting the output of said bridge across the cathode and grid of said tube; a plate circuit for said tube so connected that said tube is maintained conductive when said bridge is unbalanced in said one sense and becomes non-conductive when said bridge substantially rebalances; a winding in said plate circuit for maintaining said relay closed while said tube is conductive; an unbalancing circuit completed upon de-energization of said plate circuit for decisively unbalancing said bridge in a sense to maintain said tube non-conductive, the impedance of said unbalancing circuit being such as to prevent said bridge from being rebalanced by changes in value of said thermally responsive impedance due to cooling of the battery, and manually actuated means for de-activating said unbalancing circuit.

7. In a battery charger the combination of, a charging circuit including a transformer; a manually actuated tap switch for said transformer; a relay having normally open contacts in said charging circuit; a Wheatstone bridge including in one arm an impedance of predetermined value and in the arm balancing said one arm a thermally responsive impedance adapted to be subjected to the internal temperature of the battery being charged, whereby said bridge is unbalanced in one sense when the internal temperature of the battery being charged is below a predetermined value and is substantially rebalanced when the internal temperature of the battery reaches said predetermined value during charging; a thermionic tube including a cathode, a control grid, and a plate; a circuit connecting the output of said bridge across the cathode and grid of said tube; a plate circuit for said tube so connected that said tube is maintained conductive when said bridge is unbalanced in said one sense and becomes non-conductive when said bridge substantially rebalances; a winding in said plate circuit for maintaining said relay closed while said tube is conductive; an unbalancing circuit completed upon de-energization of said plate circuit for decisively unbalancing said bridge in a sense to maintain said tube non-conductive, the impedance of said unbalancing circuit being such as to prevent said bridge from being rebalanced by changes in value of said thermally responsive impedance due to cooling of the battery; a switch in said unbalancing circuit biased to a normally closed position, and means actuated by adjustment of said tap switch for momentarily opening said switch.

8. In a fast charger the combination of, a charging circuit adapted to convert alternating current to direct current and supply said direct current to a battery; a contactor in said charging circuit; a transformer including a primary winding bridged across an alternating current portion of said charging circuit; a Wheatstone bridge supplied with alternating current by said transformer, said bridge including in one arm a thermally responsive impedance adapted to be maintained in close heat transfer relation and electrical contact with the electrolyte of the battery being charged by said charging circuit; a thermionic tube comprising a cathode, a control grid and a plate; a circuit connecting the output of said bridge across the cathode and grid of said tube; and a plate circuit for said tube, said plate circuit including electrical means adapted to actuate said contactor when said tube is conductive.

9. A battery charging apparatus comprising a charging circuit for supplying charging current to a battery; a relay including an actuating winding, a first set of contacts and a second set of contacts and being biased to close said first set of contacts and open said second set of contacts when said winding is de-energized; a Wheatstone bridge including in one arm an impedance of predetermined value and in the arm balancing said one arm a thermally responsive impedance having a negative temperature coefficient and being adapted to be subjected to the internal temperature of the battery being charged, whereby said bridge is unbalanced in one sense when the internal temperature of the battery being charged is below a predetermined value and is rebalanced when the internal temperature of the battery reaches said predetermined value during charging; means responsive only to unbalance of said bridge in said one sense to energize said winding of said relay to open said first set of contacts and close said second set of contacts; an unbalancing circuit arranged to connect an unbalancing impedance in parallel with said thermally responsive impedance, said unbalancing circuit being conductive only when said first set of relay contacts is closed, the value of said unbalancing impedance being less than the value of said thermally responsive impedance when said thermally responsive impedance is at a temperature causing said bridge to be balanced, and manually operable means for interrupting said unbalancing circuit, said charging circuit being conductive only when said second set of relay contacts is closed.

10. In a fast charger the combination of, a charging circuit adapted to convert alternating current to direct current and supply said direct current to a battery; a relay having contacts in said charging circuit; a transformer including a primary winding bridged across an alternating current portion of said charging circuit; a Wheatstone bridge supplied with alternating current by said transformer, said bridge including in one arm an impedance of predetermined value and in the arm balancing said one arm a thermally responsive impedance adapted to be maintained in close heat transfer relation and electrical contact with the electrolyte of the battery being charged by said charging circuit, whereby said bridge is unbalanced in a definite sense whenever the temperature of said electrolyte, as sensed by said thermally responsive impedance, is below a predetermined value and is rebalanced when the temperature of said electrolyte reaches said predetermined value during charging; and electrical means responsive to the output of said bridge for causing said contacts of said relay to be closed, completing said charging circuit, only while said bridge is unbalanced in said definite sense and to be opened when said bridge is substantially balanced.

11. In a battery charger the combination of, means for supplying charging current to a battery; a contactor for interrupting the supply of current to the battery; a balanceable network including a thermally responsive impedance; means whereby said thermally responsive impedance may be immersed in the electrolyte of the battery; electrical means responsive to the output of said network for maintaining said contactor closed only while said network is unbalanced in a definite sense caused by a relatively low temperature of said thermally responsive impedance and for causing said contactor to be opened upon rebalancing of said network; automatic lock-out means for preventing said contactor from being reclosed by said electrical means after said network has been rebalanced, even though the battery be allowed to cool while still connected to the charger; and manually operated means for de-activating said automatic lock-out means in order that another battery may be charged.

LEWIS A. MEDLAR.
JAMES BOND GODSHALK.

REFERENCES CITED

The following references are of record in the file of this patent:

UNITED STATES PATENTS

| Number | Name | Date |
|---|---|---|
| Re. 21,716 | Bacon | Feb. 18, 1941 |
| 976,747 | Schmidt | Nov. 22, 1910 |
| 1,098,692 | Stahl | June 2, 1914 |
| 1,276,589 | Steinmetz | Aug. 20, 1918 |
| 1,457,863 | Strawmyer et al. | June 5, 1923 |
| 1,602,559 | Strawmyer | Oct. 12, 1926 |
| 1,974,187 | Malpass | Sept. 18, 1934 |
| 2,102,030 | Quereau | Dec. 14, 1937 |
| 2,296,924 | Heyer et al. | Sept. 29, 1942 |
| 2,307,626 | Kelly | Jan. 5, 1943 |
| 2,310,514 | Callender | Feb. 9, 1943 |
| 2,354,877 | Peters | Aug. 1, 1944 |
| 2,369,826 | Heyer et al. | Feb. 20, 1945 |
| 2,373,160 | Bollman et al. | Apr. 10, 1945 |
| 2,377,596 | Williams | June 5, 1945 |
| 2,379,317 | Picciano | June 26, 1945 |
| 2,392,737 | Heyer | Jan. 8, 1946 |
| 2,402,695 | Taylor et al. | June 25, 1946 |
| 2,432,069 | Pugh | Dec. 2, 1947 |
| 2,498,814 | Little et al. | Feb. 28, 1950 |
| 2,499,663 | Medlar | Mar. 7, 1950 |
| 2,526,251 | Medlar | Oct. 17, 1950 |